US008758715B2

(12) United States Patent
Wicks et al.

(10) Patent No.: US 8,758,715 B2
(45) Date of Patent: Jun. 24, 2014

(54) POROUS WALL HOLLOW GLASS MICROSPHERES AS A MEDIUM OR SUBSTRATE FOR STORAGE AND FORMATION OF NOVEL MATERIALS

(75) Inventors: George G. Wicks, Aiken, SC (US); Steven M. Serkiz, Aiken, SC (US); Ragaiy Zidan, Aiken, SC (US); Leung K Heung, Aiken, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 222 days.

(21) Appl. No.: 13/199,330

(22) Filed: Aug. 26, 2011

(65) Prior Publication Data

US 2012/0051997 A1 Mar. 1, 2012

Related U.S. Application Data

(60) Provisional application No. 61/377,197, filed on Aug. 26, 2010.

(51) Int. Cl.
| | | |
|---|---|---|
| *B01J 19/08* | (2006.01) | |
| *C01B 31/00* | (2006.01) | |
| *C01B 31/04* | (2006.01) | |
| *B32B 3/26* | (2006.01) | |

(52) U.S. Cl.
USPC ............. 423/445 B; 423/445 R; 423/448; 428/319.1; 428/304.4; 977/842

(58) Field of Classification Search
None
See application file for complete search history.

(56) References Cited

U.S. PATENT DOCUMENTS

| | | | | |
|---|---|---|---|---|
| 4,637,990 A | * | 1/1987 | Torobin | 502/10 |
| 6,158,194 A | | 12/2000 | Winningham | |
| 6,921,670 B2 | | 7/2005 | Carpenter | |
| 7,198,867 B2 | * | 4/2007 | Sanders | 429/218.2 |
| 7,479,052 B2 | * | 1/2009 | Kim et al. | 445/50 |
| 8,377,555 B2 | * | 2/2013 | Mohtadi et al. | 428/404 |
| 8,535,725 B2 | * | 9/2013 | Li et al. | 424/489 |
| 8,603,578 B2 | * | 12/2013 | Smith et al. | 427/212 |
| 2003/0224439 A1 | | 12/2003 | Lafferty et al. | |
| 2006/0043861 A1 | * | 3/2006 | Liu | 313/311 |
| 2006/0059953 A1 | * | 3/2006 | Heung et al. | 65/440 |
| 2006/0060820 A1 | | 3/2006 | Schumacher et al. | |
| 2008/0241576 A1 | * | 10/2008 | Le Gall et al. | 428/621 |
| 2009/0211399 A1 | | 8/2009 | Mohtadi et al. | |

FOREIGN PATENT DOCUMENTS

WO WO/2007/050362 5/2007

* cited by examiner

*Primary Examiner* — Guinever Gregorio
(74) *Attorney, Agent, or Firm* — J. Bennett Mullinax, LLC

(57) ABSTRACT

Porous wall hollow glass microspheres are provided as a template for formation of nanostructures such as carbon nanotubes, In addition, the carbon nanotubes in combination with the porous wall hollow glass microsphere provides an additional reaction template with respect to carbon nanotubes.

6 Claims, 4 Drawing Sheets

POROUS WALL HOLLOW GLASS MICROSPHERES AS A MEDIUM OR SUBSTRATE FOR STORAGE AND FORMATION OF NOVEL MATERIALS

RELATED APPLICATIONS

This application claims the benefit of U.S. Provisional Application 61/377,197, filed on Aug. 26, 2010 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards the use of porous wall hollow glass microspheres and its associated pore structures as a template and associated microscale reaction environment for formation of novel compounds. The templating and reaction process can occur on, in and through the porosity of the outer glass microsphere walls as well as within the interior regions of the porous wall hollow glass microspheres, the microspheres provide. Unique nanostructures and compositions may be generated inside the glass microspheres which provide an enclosed protective environment for the materials so formed.

BACKGROUND OF THE INVENTION

This invention relates to the formation and use of porous wall, hollow glass microspheres as set forth in US Published application 2006/0060820 to Schumacher et al. and also to WO/2007/050362 to Wicks et al., the above two publications being incorporated herein by reference in their entirety. The invention further relates to published US Patent application 20090211399 filed Feb. 22, 2008 entitled Gas Storage Materials, Including Hydrogen Storage Materials and having inventors Rana F. Mohtadi, George G. Wicks, Leung K. Heung and Kenji Nakamura and assigned to Toyota Motor Corporation and Savannah River National Laboratory and which is incorporated herein by reference.

There are a variety of substrates and processes utilized to form commercially useful materials including hydrogen storage materials, carbon nanotubes, catalysts, other nanostructures from carbon and other substrates. Often, there is a desire to organize the shape and structure of such produced materials as seen in reference to U.S. Pat. No. 6,518,194 and US Publication 2006/0043861 all of which are incorporated wherein by reference.

The 2006/0043861 uses a porous glass substrate having a catalyst placed in the open pores. Carbon nanotubes may be grown in this substrate using techniques such as chemical vapor deposition.

The U.S. Pat. No. 6,518,194 discloses using a pattern substrate to form desired nanostructures which conform to the pattern.

SUMMARY OF THE INVENTION

It is one aspect of at least one of the present embodiments to provide for a porous wall hollow glass microsphere (PWHGM) in which the pore walls and interior walls of the hollow glass microsphere provide at least one of a patterned surface, an improved substrate, or a nucleating site for the formation of a nanomaterial which may include a hydrogen storage material, a carbon nanotube, metal catalysts, or similar nanostructure. The methodology and resulting material found in associate with a PWHGM exhibits a high surface area which can be used to advantage in subsequent chemical reactions.

Further, it has been observed that materials formed may have a different morphology and/or chemical or mineralogical structure than similar materials formed outside the contained environment or protective enclosure of a porous wall hollow glass microsphere. Accordingly, the physical and chemical properties exhibited by the resulting form of material, which can now also include reactive as well as non-reactive material may offer unique advantages not otherwise available from conventional materials formed outside of a porous hollow glass wall microsphere substrate.

These and other features, aspects, and advantages of the present invention will become better understood with reference to the following description and appended claims.

BRIEF DESCRIPTION OF THE DRAWINGS

A fully enabling disclosure of the present invention, including the best mode thereof to one of ordinary skill in the art, is set forth more particularly in the remainder of the specification, including reference to the accompanying drawings.

DESCRIPTION OF THE PREFERRED EMBODIMENT

Figure 1:
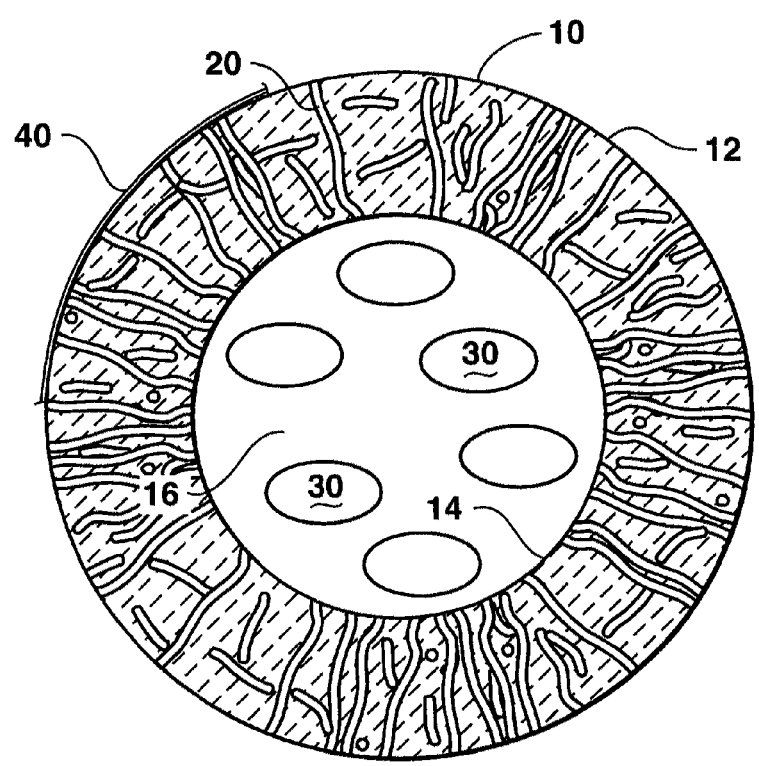
FIG. 1 is a schematic cross-sectional view of a porous wall hollow glass microsphere.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not repeated in the descriptions of subsequent figures, although such apparatus or process is labeled with the same reference numbers.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

Porous wall hollow glass microspheres are a novel form of glass material having a hollow central cavity surrounded by a silica shell. As seen in reference to FIG. 1, a porous wall hollow glass microsphere 10 is provided having an exterior surface 12 and an interior surface 14 which define an interior cavity 16. A plurality of pores 20, as described below, form a network of nanometer-size channels which connect the interior 16 to an exterior of the PWHGMs, Optionally, an outer coating 40 may be provided from a variety of functional materials including gas diffusion barriers or reactive materials such as catalyst which may facilitate nanostructure (e.g., nanotubes) formation as described below. Similarly, the inside of the PWHGMs may have various additives or reactants 30 which can be introduced through pressure or combination of heat and pressure through the pores. The reactants 30 may include carbon precursors for nanotube production, various catalysts, or hydrogen storage materials.

The wall may have a thickness of about 1 micrometer (μm) to about 2 μm. The wall of the silica shell is mesoporous, with a tortuous network of nanometer-scale channels, also referred to herein as pores, penetrating the shell and connecting the outside with the interior central cavity as seen in FIG. 1. This combination of a hollow central with mesoporous walls for controlled entry and release of materials is a unique characteristic that distinguishes PW-HGMs from other glass materials currently available for nanostructure production.

Porous wall hollow glass microspheres, also referred to herein as porous wall hollow glass microspheres, hollow porous-wall glass microspheres, hollow porous wall glass microspheres, PW-HGMs, PW-HGM, and PWHGMs, may be produced by any of a variety of methods, including, but not limited to, those described in more detail in WO 2008/069777; WO 2007/050362; U.S. Pat. No. 7,666,807; U.S. patent application Ser. No. 10/946,464, filed Sep. 21, 2004; U.S. patent application Ser. No. 12/315,544, and Wicks et al, 2008, Am Ceram Soc Bull; 87:23-8, each of which is incorporated by reference herein Porous wall hollow glass microspheres for use in the compositions of the present invention include porous-wall hollow glass microspheres with any of a variety of diameters. For example, porous wall hollow glass microspheres used in the compositions of the present invention may have a diameter range of sizing of about 1 micron to about 200 microns.

Porous wall hollow glass microspheres exhibit a high degree of wall porosity. As used herein, the term "porosity" means a series of pores and similar openings which either directly or indirectly defines a series of passageways which provide communication between the interior and the exterior of the hollow glass microsphere. Porous-wall hollow glass microspheres of the present invention may have any of a range of porosities. For example, wall porosity (also referred to herein as pore size) may be about 1 nanometer (nm) to about 300 nanometers.

Figure 2:
FIG. 2 is a scanning electron micrograph showing the formation of an alanate nanostructure extending from pores extending from a porous wall hollow glass microsphere.

As seen in reference to FIG. 2, needle-like structures of an alanate material as described in Example 1 are present which are formed which are used to fill the microspheres. The alanate nanofilaments can extend within an interior of the porous wall hollow glass microsphere as well as extending along an exterior of the porous wall hollow glass microsphere. In addition, the porous walls themselves can provide a template or substrate for the formation of various nanostructures, including reactive nanostructures protected by the interior contained environment. Accordingly, a porous wall hollow glass microsphere provides a substrate with at least three different reaction sites. Reactions can occur within an interior of the microsphere, within pores which traverse the microsphere, and along an exterior surface of the microsphere. Each location is believed to offer unique properties, such that different morphologies as well as chemical composition can be obtained from a starting nucleating material.

Further, it can be seen that the arrangement of the pores can also provide for a patterned array of materials to be developed which may extend from either an interior or exterior pore of the PWHGM. It is believed that the materials formed on a PWHGM substrate may have a different stoichiometry such that not only is the nanostructure different but the materials may represent a new phase for a composition of the materials.

Other structures with unique characteristics can be formed in or on the wall pores, including carbon nanotubes. These materials can form and/or react from the 'outside in'. For instance, nanotube formation in which the microsphere interior may have a higher relative pressure of a gas such as acetylene, hydrogen or nitrogen than an exterior of the microsphere can influence the reaction pathway and hence product composition of nanostructure formation. Similarly, creating a higher external pressure, relative to the microsphere interior, can alter the resulting nanotube structure morphology and/or composition. By controlling pressure differentials during nanostructure formation, the nanostructure morphology within the interior of the microsphere, within the pores traversing the glass microsphere walls, and along the exterior of the glass microspheres may be varied.

For instance, an exterior wall of the porous microsphere may be used as a nucleating site and materials can be grown through the pore and extend into an interior of the hollow glass microsphere. Similarly, it is also possible to use the interior surfaces of the porous wall hollow glass microsphere for a nucleation site or as a location for a formation reaction. It is also possible to use the surfaces of the pores as a formation site such as having one reactant on an interior of the hollow glass microsphere with a second reactant on an exterior and manipulating the process conditions such that reaction in reaction products formed on the surfaces of the pores defined through the walls of the hollow glass microsphere, Further, the void space in the interior of the porous wall hollow glass microsphere provides a protective environment for materials formed within the pores and as an interior of the microsphere. As such, materials can form in a controlled environment and be maintained under conditions which maintain the functionality of nanostructures formed within the interior of the porous hollow wall glass microsphere. As noted in the Applicant's prior publications indentified in the Background of the Invention and which are incorporated herein by reference, it is possible to control and regulate the pores size either prior to or subsequent to the formation of nanostructures so as to restrict the average pore size. By altering the pore size, it is possible to prevent the entry of undesired materials such as gaseous poisons to the interior of the microsphere. The control of pore size can be carried out by either a heat treatment process or the use of membrane type coatings including sol gel coatings. Additional details on the preparation of use of the PWHGMs can be seen in reference to U.S. Pat. No. 7,666,807 and PCT Application US2010/042117 which are incorporated herein by reference.

While for certain applications, the preferred embodiments are porous wall hollow glass microspheres, for other applications fragments of microspheres may be used to provide templates for nanostructure deposition and growth. For certain applications it is envisioned that the template of pores present on either an interior wall surface or an exterior wall surface of the porous wall glass may be a glass substrate which is not in the form of an intact microsphere. This arrangement allows for the formation of patterns and arrays of various end products using materials or catalytic agents which might not otherwise pass through porous walls. The arrangement allows for the formation of nanostructures with modified thermodynamic characteristics that can be desirable for specific applications.

The pores present in the glass provide a template such that materials performed thereon may take on the morphology of the porosity. For instance, the porosity can be used to orient spacing of nanomaterials. Such spacing may be important in the formation of conductors or other electronic or physical components provided by the coating material formed on the porous walls.

It is further envisioned that a variety of different reaction pathways may be used to fill the nanopores and to produce various nanostructures. For instance, various techniques include solution deposition and metal reduction both within the pores and internal void space and in situ chemical vapor deposition where catalytic solutions and aromatic carbon sources may be placed into the pore structure or internal void space and heated so as to provide a carbon source for the subsequent formation of carbon nanotubes.

An ability to control the porosity of the resulting porous glass allows a mechanism to control the size, shape and pattern of nanotubes with similar structures that may be produced. These different shape and structures allow for different thermodynamic and chemical properties.

Further, having the nanostructures present on a robust substrate allows for various end use applications including environmental remediation, energy systems, medical applications, and uses in electronic devices. The nature of the glass substrate allows material to be introduced into harsh environments including solvents and chemicals in which the interior contents of a porous wall glass microsphere are protected from such an environment.

While alanate-based nanofilaments may be produced from the inside and the outside of porous wall hollow glass microspheres as noted in the attached page of figures, it is also possible to produce carbon nanotubes using chemical vapor deposition as well as other compositions and compounds. In addition, it is believed that the template of a porous hollow glass wall microsphere or fragments of microspheres to provide useful nucleating sites for a variety of nanostructures and crystalline formation processes, particularly where patterned growth and spacial nucleating templates may be of an advantage.

EXAMPLE 1

Hollow glass spheres were acid leached to allow for a porous network structure formation. The encapsulation procedure included dissolution of a reactive solid storage material in a solvent such as tetrahydrofuran (THF) or an ether such as diethyl ether. The dissolution was carried out at room temperature and ambient pressure, but elevated temperature and/or pressure may be used to enhance the dissolution of the material in the solvent. The solution was allowed to diffuse to occur through the pores of the hollow glass spheres walls. Precipitation of the reactive storage material within the interior cavity of the hollow spheres resulted from evaporating the solvent under vacuum.

Hollow spheres were prepared using phase-separated glass, as discussed in more detail below, and the microspheres were had porous walls with most pore diameters in the range of 100 Angstroms to a few thousands of Angstroms (e.g. 3,000 Angstroms). In other examples, pore diameters may range from approximately 10 Angstroms to approximately 1000 Angstroms. Sodium alanate diffusion at room temperature into the interior cavity of the glass spheres was allowed through solution diffusion, using $NaAlH_4$ dissolved in a tetrahydrofuran solvent. Microscopy characterization confirmed the encapsulation of the sodium alanate in the interior cavity of the hollow glass microspheres.

The presence of nanoscale-size crystal formation was observed on the interior surface of the glass wall as well as extending through the pores on an exterior surface of the PWHGN (FIG. 2). This shows that nano-crystallite formation of sodium alanate can be achieved by precipitating alanate on a silica surface. In this context, a nanocrystallite is a crystallite having a dimension (such as measured along a dimension normal to the direction of elongation) of less than a few microns, in some examples less than approximately 1 micron.

EXAMPLE 2

Figure 3:
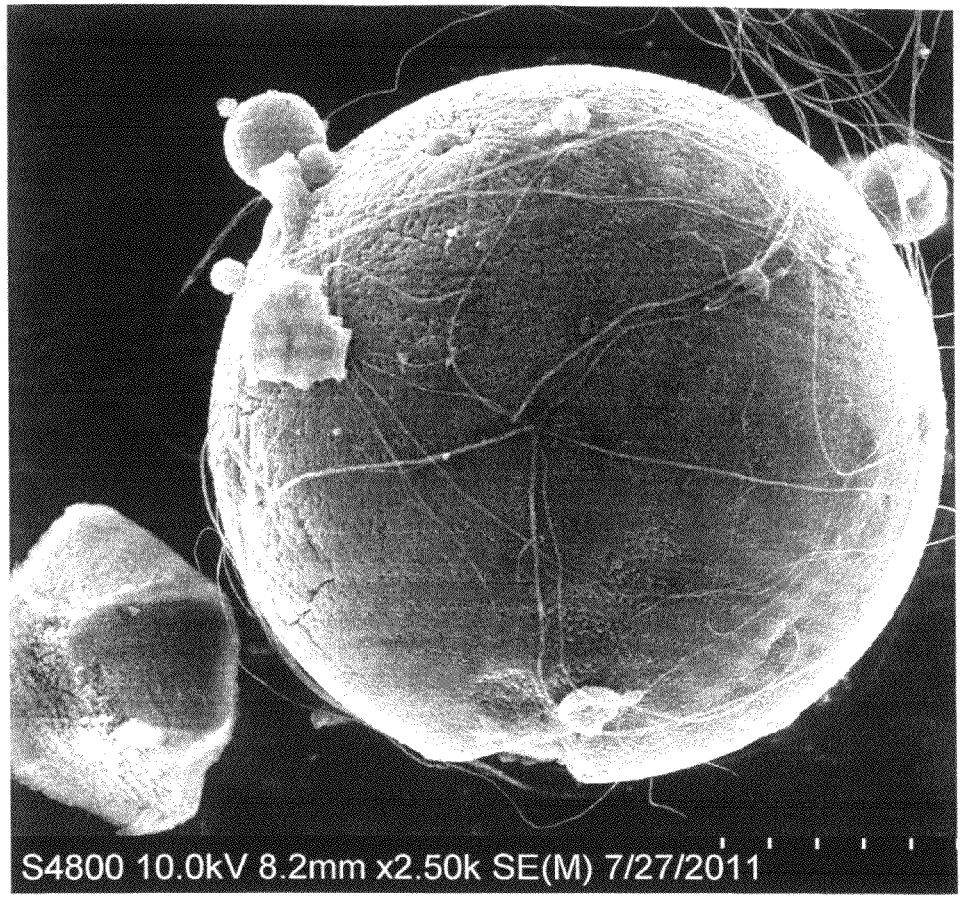
FIG. 3 is a scanning electron micrograph showing the formation of carbon nanotubes formed along the surface of a porous wall on a glass microsphere which extend through pores of the microsphere wall.
Figure 4:
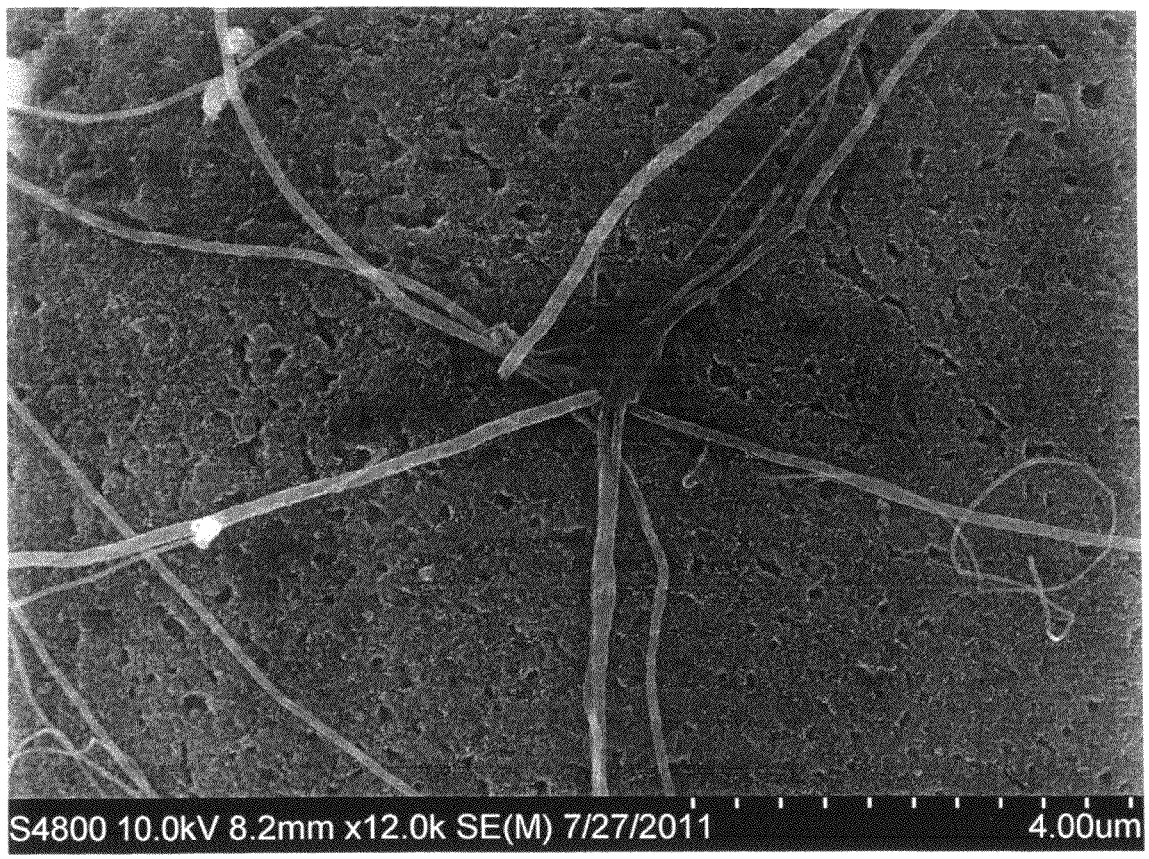
FIG. 4 is a close up of FIG. 3 showing additional details of the carbon nanotube in relation to a pore of the hollow glass microsphere.

Carbon nanotubes were formed on the exterior surface of porous wall hollow glass microsphere as seen in reference to FIGS. 3 and 4. A chemical vapor deposition reaction pathway for carbon nanotubes using xylene and ferrocene was used. In this example the PWHGMs were filled under vacuum with a 15 wt. percent solution of ferrocene in xylenes. The filled PWHGMs were then heated in a tube furnace for one hour at 500° C. under 800 sccm He gas. As seen in reference to FIGS. 3 and 4 nanotubes formation occurred on the exterior surface of the PWHGM. It is believed that individual pores defined on the exterior wall of the PWHGM provide a nucleating site for the formation of the carbon nanotubes.

It is believed that the porous glass substrate enables a catalyst to be anchored inside the pore so that the catalyst does not sinter during nanotube growth, and thus, distinctive nanotubes of a desired diameter may be produced. Specifically, the substrate pore size can be used to control nanotube diameter through affecting the catalyst dispersion or catalyst sizes. The pore density of the porosity may also be used to control nanotube density (i.e., the number of nanotubes per unit surface area). Further, the porous glass substrate allows nanotube orientation to be controlled. Nanotube orientation is also affected by the direction of flow of a hydrocarbon precursor gas from a source toward a glass substrate. Specifically, when the reacting gas is introduced in a direction perpendicular to the substrate surface during the growth process, the nanotube may be grown along the flow direction so that an array of nanotubes perpendicular to the surface is formed.

Carbon nanotube growth on a glass substrate consists of three basic steps. Initially, after an appropriate glass substrate has been selected and cleaned, a metal catalyst is deposited on the surface of the substrate. Cleaning of the substrate prior to deposition of the metal catalyst may be achieved using various solvents such as trichloroethylene, acetone and/or methanol, followed by rinsing with deionized water, drying, and calcinations. Examples of metal catalysts that may be used include Ni, Pd, Pt, Fe, Ru, Os, Co, Rh, Ir, Cu, Ag, Au, Zn, Cd, Mn, Te, Re, Cr, Mo, W, V, Nb, Ta, Ti, Zr, Hf, Sc, Y, La, and combinations of these metals, including related alloys, compounds or composite films. Preferred metals include Fe, Co, Mo, Ni, Cu, and preferred composites or alloys include CoMo, NiMo, Fe/Mo, Ni/Fe, Ni/Co, Ni/Cr, Ni/Ti, Ni/W, Ni/Si, Ni/Ge, Ni/C, Fe/Co, Fe/Cr, Fe/Ti, Fe/W, Fe/Si, Fe/Ge, Fe/C, Co/Cr, Co/Ti, Co/W, Co/Si, Co/C, Cu/Cr, Cu/Ti, Cu/W, Cu/Si, Cu/Ge, and Cu/C. The catalyst may be deposited on the substrate using any of a variety of known wet chemistry techniques or vapor deposition techniques. Vapor deposition techniques include electron-beam evaporation and magnetron sputtering.

After deposition of the catalyst, carbon nanotubes may be grown on the substrate using any of various well-known nanotube deposition techniques, which include thermal chemical vapor deposition (CVD), plasma enhanced (microwave or radio frequency) CVD hot-filament CVD. The catalyst may also be deposited on the substrate using vacuum arc, pulsed-laser ablation, electroplating, sol-gel chemistry, or electrochemical techniques.

In the chemical deposition processes used for growing the carbon nanotubes on the substrate surface, a stream of carbon precursor gas is directed at the substrate surface. Hydrocarbon precursor gases are typically diluted with hydrogen, nitrogen, argon, helium, neon, or a combination thereof. Examples of suitable hydrocarbon precursors include acetylene, ethylene, propylene, butane, methane, ethane, propane, butane, pentane, hexane, cyclohexane, benzene and toluene. Other suitable precursor gases include carbon precursors such as CO. Thus, the carbon precursor used during chemical vapor deposition for forming carbon nanotubes may be either a hydrocarbon precursor that is pyrolysed during deposition or a non-hydrocarbon, carbon-precursor such as carbon monoxide, which may be mixed with $NH_3$ gas. The $NH_3$ gas acts as a catalyst and a dilution gas.

The nanotube growth process via chemical vapor deposition is typically conducted at an elevated temperature, usually about 500° C. or higher. The process is carried out at moderately high pressures (2˜10 bar), at atmospheric pressure or below atmospheric pressure, depending on the catalytic reaction systems. As is known in the art, the deposition conditions may be controlled to deposit single-wall or multi-wall carbon nanotubes.

FIG. 1 schematically illustrates a PWHGM 10 that is generally solid glass throughout at least a part of its thickness, but includes a surface 12 in which pores 20 are defined. A catalyst may be deposited in pores 20 to provide active sites for growth of carbon nanotubes during chemical vapor deposition. FIGS. 3 and 4 shows carbon nanotubes grown from the PWHGM pores. The pore confines the catalyst domain and controls the diameter and pattern of the carbon nanotube. The catalyst and carbon nanotube 16 are stabilized due to enhanced adhesion onto the high silica glass substrate of the PWHGM.

It is also envisioned that the interior of the PWHGM may be used as a synthesis site for the formation of carbon nanotubes in other nanostructures. Using acetylene as the carbon source, the acetylene is introduced under pressure into the interior of the porous wall hollow glass microsphere where the interior pores within the PWHGM provide nucleating sites during formation condarons for of carbon nanotubes. Having carbon nanotubes formed in a protective environment within an interior of a PWHGM would afford new uses and opportunities for the carbon nanofibers. Such nanofibers, present within an interior of the PWHGM can be protected from adverse environmental conditions. Further, use of pressure in conjunction with the controlled porosity of the PWHGM will allow various reactants to be introduced into the interior of the PWHGM so that reactions with the population of carbon nanofibers can occur in the protected interior environment of the microsphere.

It is believed that the carbon nanotubes may be formed within an interior of the PWHGM, may occur within the pores of the PWHGM, or may be formed on an exterior surface of the PWHGM, all of which provide for a useful and novel reaction substrate for formation of nanotubes and a reaction substrate for subsequent use of the nanotubes.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention. In addition, it should be understood that aspects of the various embodiments may be interchanged, both in whole, and in part. Therefore, the spirit and scope of the invention should not be limited to the description of the preferred versions contained therein.

The invention claimed is:

1. A reaction substrate, comprising:
    a glass substrate comprising a porous wall hollow glass microsphere;
        a plurality of carbon nanotubes attached to the porous surface of the glass substrate; and
            a carbon source contained within the interior of the porous wall hollow glass microsphere.

2. The reaction substrate of claim 1, wherein the carbon source is acetylene.

3. The reaction substrate of claim 1, wherein the pores of the porous surface have an average size of from 1 nm to 1000 nm.

4. The reaction substrate of claim 1, wherein the pores of the porous surface have an average size of from 2 nm to 100 nm.

5. The reaction substrate of claim 1, wherein the pores extend throughout the thickness of the substrate.

6. A reaction substrate, comprising:
    a porous wall hollow, glass microsphere having a porous surface with an average pore size in the range of from 1 nm to 1000 nm;
        a carbon source contained within the interior of the porous wall hollow glass microsphere; and,
        a plurality of carbon nanotubes extending from a corresponding plurality of pores defined by the glass substrate.

* * * * *